United States Patent
Quade

(10) Patent No.: US 11,522,968 B2
(45) Date of Patent: Dec. 6, 2022

(54) METHOD OF GENERATING AND HANDLING OF DSL-CONNECTION PROFILES, THEREBY PROVIDING AN ADAPTATION FUNCTIONALITY OF A DSL-CONNECTION

(71) Applicant: Deutsche Telekom AG, Bonn (DE)

(72) Inventor: Michael Quade, Meckenheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 103 days.

(21) Appl. No.: 17/194,335

(22) Filed: Mar. 8, 2021

(65) Prior Publication Data

US 2021/0289037 A1 Sep. 16, 2021

(30) Foreign Application Priority Data

Mar. 10, 2020 (EP) ..................................... 20162086

(51) Int. Cl.
*H04L 67/30* (2022.01)
*H04L 12/64* (2006.01)
(Continued)

(52) U.S. Cl.
CPC .............. *H04L 67/51* (2022.05); *H04L 67/30* (2013.01); *H04M 11/062* (2013.01); *H04L 2012/6478* (2013.01)

(58) Field of Classification Search
None
See application file for complete search history.

(56) References Cited

U.S. PATENT DOCUMENTS

2015/0146767 A1 5/2015 Kerpez et al.
2016/0006622 A1* 1/2016 Bednarz .............. H04L 41/5051
370/252

(Continued)

FOREIGN PATENT DOCUMENTS

WO WO 2013165429 A 11/2013

*Primary Examiner* — Tonia L Dollinger
*Assistant Examiner* — Jonathan A Sparks
(74) *Attorney, Agent, or Firm* — Leydig, Voit & Mayer, Ltd.

(57) ABSTRACT

A method of generating and handling of Digital Subscriber Line (DSL) connection profiles includes: collecting, each time a service is requested by a user of a DSL-connection, individual service-based-data, wherein the individual service-based-data comprise the start time and end time of use of the requested service and a transmit spectrum routed via the DSL-connection during the use of the requested service; analyzing the collected individual service-based-data and based thereon assigning to the analyzed collected individual service-based-data a current individual DSL-connection profile comprising individual repetition times and an individual mean transmit data rate; comparing the current individual DSL-connection profile with an individual DSL-connection profile stored in an operations scheduling memory; and based on the comparing, updating an already stored individual DSL-connection profile based on the current individual DSL-connection profile or storing the current individual DSL-connection profile as a further individual DSL-connection profile in the operations scheduling memory.

5 Claims, 2 Drawing Sheets

(51) Int. Cl.
*H04L 67/51* (2022.01)
*H04M 11/06* (2006.01)

(56) References Cited

U.S. PATENT DOCUMENTS

2016/0212754 A1* 7/2016 Mendiola .............. H04W 72/10
2017/0005859 A1   1/2017 Morsman
2018/0131582 A1* 5/2018 Schnitzer ................ H04L 41/12
2020/0008138 A1* 1/2020 Sasindran ............. H04W 76/10
2020/0382538 A1* 12/2020 Feezell ............... H04L 63/1433

* cited by examiner

METHOD OF GENERATING AND HANDLING OF DSL-CONNECTION PROFILES, THEREBY PROVIDING AN ADAPTATION FUNCTIONALITY OF A DSL-CONNECTION

CROSS-REFERENCE TO PRIOR APPLICATIONS

Priority is claimed to European Patent Application No. EP 20 162 086.1, filed on Mar. 10, 2020, the entire disclosure of which is hereby incorporated by reference herein.

FIELD

The invention relates to a method of generating and handling of Digital Subscriber Line (DSL)-connection-profiles, thereby providing an adaptation functionality of a DSL-connection.

BACKGROUND

An adaptation of DSL-connections is known, for example, from WO 2013/165429 A1. According to the disclosure thereof, based on a variant transmit spectrum for a DSL-connection for example, the transmission on some subcarrier(s) may be terminated to save power. In this regard, higher sub-carriers may be terminated when they are not needed for carrying data, such as during idle periods or periods corresponding to low transmission rates. Consequently, with such an adaptation of DSL-connections, an energy management functionality of saving energy generally can be provided.

Furthermore, WO 2013/165429 A1 also describes that instead of turning off a DSL-connection completely, the DSL-connection may temporarily go into a state of low power usage that still transmits a low data rate. A low power mode may be invoked when there is no traffic or low traffic, such as, if there is only traffic from a voice connection that is typically a low bandwidth application. Although a power-off approach would save more power than a low power mode, the requirement to perform a full retain has proven impractical.

Moreover, in this prior art document also embodiments are described, for example, of scheduling power-down and wake-up by time-of-day based on historical usage.

Accordingly, when a DSL-connection is determined to be nearly always off during certain times of the day or week, then a transition to a low-power state may be scheduled for that DSL-connection near those times and transitions to a higher-power data carrying state may additionally be scheduled before the DSL-connection is expected to carry traffic again. In addition to a scheduled high-power data carrying state, the DSL-connection may transition to a higher power state at any time when traffic is requested by the user.

Thus, by reducing the DSL spectrum used, or in general xDSL spectrum (with xDSL being the collective name for the various DSL technologies for the broadband connection of end users via copper cable in a local network, wherein xDSL may for example refer to ADSL (Asymmetric DSL), SDSL (Symmetric DSL), HDSL (High Speed DSL), VDSL (Very High Speed DSL), ADSL2, ADSL2+, HDSL2, SHDSL (Single-pair High-speed DSL), VDSL2, vectored VDSL2, G.fast, with the different DSL technologies being commonly implemented in accordance with respective standards, for example comprising the ITU standards G.992.1, G.992.3, G.992.5, G.993.1, G.993.2, G.993.5, G.998.4, G.994.1 and G.997.1), DSL-technology enables power saving functionality both in the network element "NE", such as a digital subscriber line access multiplexer ("DSLAM"), often being located in telephone exchanges or switching points that connect multiple user digital subscriber lines interfaces to a high-speed digital communications channel using multiplexing techniques, or a multi-service-access-note ("MSAN"), typically installed in a telephone exchange or switching points (although sometimes in a roadside serving area interface cabinet) which connects users' telephone lines to the core network, to provide telephone, Integrated Services Digital Network (ISDN), and broadband such as DSL all from a single platform, and even in the users' xDSL router. At the same time, the data rates are reduced to a minimum so that, for example, a voiceover IP call ("VoIP"), can just be carried out.

A problem to be solved however, is that the use of the service needing the entire transmit spectrum for a DSL connection and hence the full bandwidth thereof, requires a new synchronization of the user's xDSL router and the network element in case the bandwidth is actually reduced to a lower level and shall again use an enhanced profile with a broader transmit spectrum needed. As known, such a synchronization unfortunately can take some minutes, in particular when using super-vectorising techniques being compensation techniques in which a compensation signal is calculated during transmission, i.e. in real time, with which high-frequency interference signals are filtered out.

SUMMARY

In an exemplary embodiment, the present invention provides a method of generating and handling of Digital Subscriber Line (DSL) connection profiles, comprising: collecting, each time a service is requested by a user of a DSL-connection, individual service-based-data, wherein the individual service-based-data comprise the start time and end time of use of the requested service and a transmit spectrum routed via the DSL-connection during the use of the requested service; analyzing the collected individual service-based-data and based thereon assigning to the analyzed collected individual service-based-data a current individual DSL-connection profile comprising individual repetition times and an individual mean transmit data rate; comparing the current individual DSL-connection profile with an individual DSL-connection profile stored in an operations scheduling memory; and based on the comparing, updating an already stored individual DSL-connection profile based on the current individual DSL-connection profile or storing the current individual DSL-connection profile as a further individual DSL-connection profile in the operations scheduling memory. The method further comprises: prior to each time of repetition of a stored individual DSL-connection profile, setting a start time of correspondingly adjusting the condition of the DSL-connection to respectively match a respective imminent stored individual DSL-connection profile.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
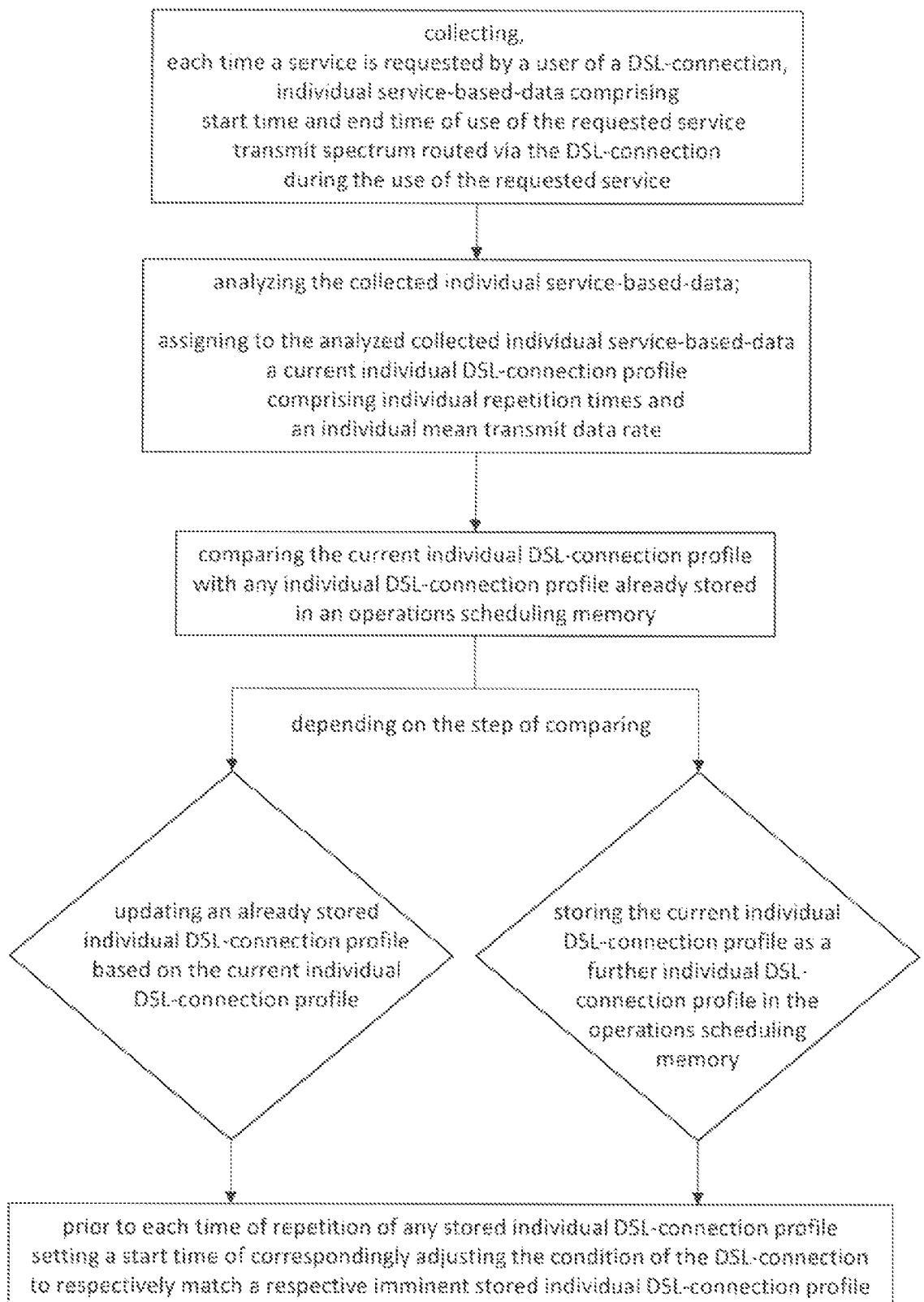
FIG. 1 is a flowchart of an embodiment of a method according to the invention.

In an exemplary embodiment, the invention provides a method of generating and handling of DSL-connection-profiles, thereby providing an adaptation functionality of a DSL-connection.

In an exemplary embodiment, each time a service is requested by a user of a DSL-connection, individual service-based-data are collected, wherein the individual service-based-data comprise the start time and end time of use of the requested service and a transmit spectrum routed via the DSL-connection during the use of the requested service.

Then, the collected individual service-based-data are analyzed and based thereon, a current individual DSL-connection profile comprising individual repetition times and an individual mean transmit data rate are assigned to the respective collected and analyzed individual service-based-data.

Each such current individual DSL-connection profile then is compared with any individual DSL-connection profile already stored in an operations scheduling memory and depending on the result of such step of comparing, either an already stored individual DSL-connection profile is updated based on the current individual DSL-connection profile or the current individual DSL-connection profile is stored as a further individual DSL-connection profile in the operations scheduling memory.

By doing so, prior to each time of repetition of any stored individual DSL-connection profile, a start time of correspondingly adjusting the condition of the DSL-connection is set to respectively match a respective imminent stored individual DSL-connection profile.

Thus, as an advantage thereof, each time a respective repetition-based individual mean transmit data rate assigned to any stored imminent DSL-connection profile is coming up, the correspondingly individual mean transmit data rate can be provided just in time. Thus, in case a very high individual mean transmit data rate has to be provided as a new individual mean transmit data rate in comparison with a current transmit data rate, the time of adjustment and, hence, the synchronization can be performed such that the synchronization is already finished at the time this higher transmit data rate is needed. On the other hand, in case the respective individual mean transmit data rate has to be switched from a higher individual mean transmit data rate to a lower individual mean transmit data rate, a very enhanced energy saving functionality is provided by the invention. As a further advantage, it can be highlighted, that exemplary embodiments of the invention provide a self-training adaptation functionality of a plurality of individual DSL-connection profiles even related to one and the same DSL-user of a DSL-connection, i.e. of the same xDSL router providing DSL-connection, as already stored individual DSL-connection profiles are updated or respective current individual DSL-connection profiles are newly stored as further individual DSL-connection profiles each time a service is requested via this DSL-connection user.

FIG. 1 shows a flowchart of an embodiment of a method of generating and handling of DSL connection-profiles. According to a first step, each time a service is requested by a user of a DSL-connection, individual service-based-data is collected. Such individual service-based-data preferably comprise the start time and end time of use of the requested service and a transmit spectrum routed via the DSL-connection during the use of the requested service. In this regard, the transmit spectrum preferably is a transmit condition that is not limited to a specific set of values but can vary. Then, by further analyzing the collected individual service-based-data, a respective current individual DSL-connection profile comprising individual repetition times and an individual mean transmit data rate can be assigned to the analyzed collected individual service-based-data. Such individual repetition times may comprise only a current planned adjustment of DSL-connection conditions or preferably, a weekly, daily or even slower or more frequently planned adjustments of DSL-connection conditions, in particular planned and automatically performed adjustment of DSL-connection conditions.

Thus, a simple embodiment of an individual DSL-connection profile could be for example, "Monday from 20:00 h to 22:00 h having an individual mean data rate of 50 mbps".

Upon assigning a respective current individual DSL-connection profile, exemplary embodiments of the invention compare it with any individual DSL-connection profile already stored in an operations scheduling memory. Depending on the result of the step of comparing, an already stored individual DSL-connection profile can be updated based on the current individual DSL-connection profile.

Thus, in case a similar individual DSL-connection profile is already stored in the operations scheduling memory, such as for example, "Friday from 20:00 h to 22:00 h having an individual mean data rate of about 50 mbps", then this already stored individual DSL-connection profile may be updated based on the current individual DSL-connection profile, e.g. to "Monday and Friday from 20:00 h to 22:00 h having an individual mean data rate of about 50 mbps".

On the other hand, if the step of comparing does not result in matching the current individual DSL-connection profile with an already stored individual DSL-connection profile, then the current individual DSL-connection profile is stored as a further individual DSL-connection profile in the operations scheduling memory.

Thus, based on the stored individual DSL-connection profiles with the adaptation functionality, in particular leading with time to a variety of DSL-connection profiles, prior to each time of repetition of any stored individual DSL-connection profile, a start time of correspondingly adjusting the condition of the DSL-connection is set to respectively match a respective imminent stored individual DSL-connection profile, preferably just in time when needed.

Accordingly, the invention provides an enhanced adaptation functionality of a DSL-connection, respectively enabling a power saving functionality for a respective xDSL-connection with an automatic adaptation to user behavior.

In particular, for setting a proper start time to correspondingly adjust the condition of the DSL-connection to match a respective imminent stored individual DSL-connection profile, preferably to each individual DSL-connection profile a respective priority is assigned and in case the condition of the DSL-connection have to be adjusted starting from a currently used individual DSL-connection profile to match another individual but lower-priority DSL-connection profile, the start time of correspondingly adjusting the condition of the DSL-connection is set only on or after the end time of the currently used individual DSL-connection profile. Thus, according to simple embodiments of the invention, it may be sufficient that the assignment of respective priorities may be based solely on the individual mean data rates of the respectively stored DSL-connection profiles.

For further improving the adaptation functionality, i.e. in particular self-training adaptation functionality, of a plurality of individual DSL-connection profiles related to a DSL-connection, even related to one and the same DSL-user of a DSL-connection, the collecting of individual service-based-data preferably comprises the collection of data concerning to at least one of the following group of:
  the kind of service, such as gaming, surfing, VoIP-telephony, video streaming or simple data transfer, the direction of data transfer, i.e. up versus down and/or unicast versus multicast,
  a distinction between peak data rate and average data rate, DNS (Domain Name System) queries called by the user, packet headers and QoS (Quality of Services),
  the required bandwidth, and
  the respective user end device actively using the DSL-connection.

Accordingly, with exemplary embodiments of the invention, with a correspondingly adapted system, it is possible to determine for example, when the user uses which services, In an even simpler case therefor, a DSL-router at the users or user side providing DSL-connection already records the data rate currently used. In case a distinction is additionally made between a peak data rate and an average data rate, in an exemplary embodiment, DSL connection profiles can be generated and handled differentiating even TV streams from short-term WEB site calls, for example.

If the DNS queries called by the user, in particular including requests from the router cache and direct requests to the provider DNS, are used in addition or as another source of data, from the DNS resolution it can then, for example, infer the service used.

In addition or as another alternative data related to the packet headers and QoS can be evaluated.

With the aforementioned additional individual service-based-data collected and after the steps of analyzing and comparing, adapted and in particular trained individual DSL-connection profiles can be generated and handled comprising for example profiles respectively based on a day-time or week-time cluster and stored with certain data rate values.

Such clusters of specific individual profiles may have stored profile data, such as:
  "Mo-Fr. 20:00-22:00 Cluster TV Stream with an average data rate of 6 mbps and a peak data rate of 10 mbps" leading for instance to an adapted and in particular trained individual mean transmit data rate of 12 mbps;
  "Mo-Fr. 08:00-12:00 Cluster HomeOffice with an average data rate of 4 mbps and a peak data rate of 40 mbps" leading for instance to an adapted and in particular trained individual mean transmit data rate of 40 mbps;
  "Sa/So. 08:00-12:00 Cluster Web Browsing with an average data rate of 3 mbps and a peak data rate of 30 mbps" leading for instance to an adapted and in particular trained individual mean transmit data rate of 25 mbps.

Accordingly, in particular based on the kind of service an additional safety reserve can be adjusted for the respective mean transmit data rate.

Given by the above three samples, and based on a maximal possible DSL data rate of about 60 mbps, an energy saving of about 30%, 12% or 18% can be achieved.

Of course, even several clusters can occur simultaneously within one profile with a correspondingly adjusted individual mean transmit data rate and/or an individual idle profile having times of repetition, according to which usually not any service is requested or used and preferably reserving only a minimal necessary bandwidth of e.g. 384 kbps for keeping the DSL-connection alive.

Furthermore, it is also possible to take into account which user end devices are actively used with regard to a DSL-connection, and hence in particular with regard to one and the same WLAN/LAN (Wireless Local Area Network/Local Area Network) xDSL-router, at any given time and hence, whatever WLAN/LAN bandwidth is available and/or needed with these devices.

For example, if only devices are used in the WLAN and the bandwidth of these used devices is less than the maximal possible bandwidth of the DSL-connection, the maximum bandwidth of the DSL-connection does not have to be used.

If a DSL-connection may provide for example a maximal data rate of about 118 mbps, and two active user end devices are used, a first one being a WLAN device having a maximal data rate of 27 mbps on the 2.4 GHZ frequency band and a second one being a WLAN device having a maximal data rate of 47 mbps on the 5 GHZ frequency band, then for the adjustment of the condition of the DSL-connection a synchronized mean data rate of 74 mbps plus 6% for the header can be used and preferably stored for a such individual DSL-connection profile.

As already mentioned, all of the above data can be stored with the time resolution, i.e. in particular including times of repetition with its start time and end time, of a respective analyzed individual DSL-connection profile within the operations scheduling memory and hence is available for the DSL-connection, i.e. in particular to the router. Since furthermore, after starting a method in an exemplary embodiment, each newly collected and analyzed individual service based data, whenever a service is requested, is used according to an exemplary embodiment of the invention for comparison with data of already stored individual DSL-connection profiles, so that stored individual DSL-connection profiles will be updated or further individual DSL-connection profiles will be stored, each new collected and analyzed individual service based data is used as training data, in particular via machine learning, thereby providing a constantly adapting system.

Figure 2:
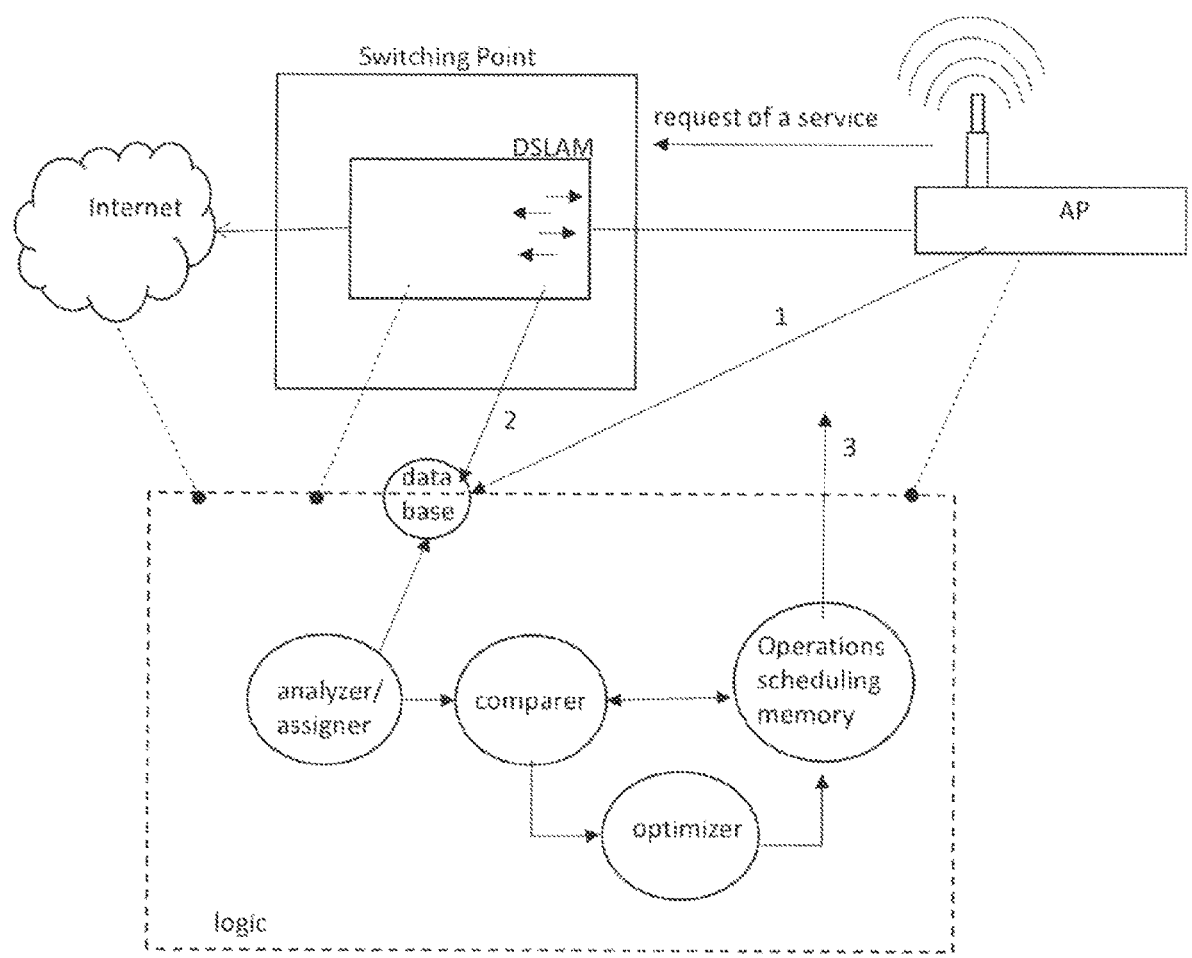
FIG. 2 is a block diagram of several apparatuses for supporting an embodiment of a method according to the invention.

FIG. 2 shows a correspondingly adapted system for performing a method in an exemplary embodiment, i.e. to generate and handle different individual profiles per DSL-connection. Therewith, a correspondingly designed logic can be located locally, i.e. in the user's access point, such as the router, centrally within a network element, such as a DSLAM or even centrally in the internet.

The respective individual service-based-data can be collected at different points.

As referenced by the arrow numbered with 1, the collection of data, when a service is requested, can be done in the access point AP, preferably being a router designed as an IAD (integrated access device). There, the used data rate can be collected and the DNS requests are available, too. Preferably, the collected data is initially stored within a database for the subsequent analyzing and assigning proceeding. In this regard, from the flow of the data transmission it can be determined on which kind of service the collected data is based, such as for example on a streaming service or on a web site call, even if the content is encrypted. Also, an assignment of a used target IP addresses via a mapping list is possible. In addition, a special client can be installed in the access point AP as a correspondingly designed logic having an analyzer and an assigner therefor and/or having a comparer and optimizer and providing the operations scheduling memory. Thus, even all of the necessary logical steps of comparing and of optimizing the operations scheduling memory, i.e. updating an already stored individual DSL-connection profile or storing a new individual DSL-connection profile, can be done in the user's access point AP.

As referenced by the arrow numbered with 2, the collection of data, when a service is requested, can be done on the net side for example in the DSLAM. There or alternatively DNS calls, data rates on the ports, data rate of a PPPoE (Point-to-Point Protocol of Ethernet) session can be collected, to give but a few examples. Here, a sample can also evaluate the contents of the session and identify the exact service used, if the encryption allows it.

In addition or alternatively, at the transfer point to the respective service providers, the IP packets could also be marked in order to reassign them to the user. The following logic having the analyzer, assigner, comparer and optimizer and providing the operations scheduling memory is in this case however always centrally structured.

Based thereon different procedures can be used for creating optimized individual DSL-connection profiles to be stored in an optimized operations scheduling memory.

As a first procedure for example, probabilities of use of the respective services and a histogram or the percentiles of the data rates used over a period of time (e.g. 2 days or 1 week) are analytically created. Via a freely selectable threshold value, a usage of the respective services at the respective time/weekday can be predicted.

As a second exemplary procedure, it can be started with the first procedure but then the usage in the time intervals is compared with a prognosis model and is then included in a training model for machine learning. Machine learning models can comprise, for example, decision tree models, forest tree models, models of neural networks and combinations thereof or even other machine learning models. In a particularly advantageous case, the logic is constructed such that the model is automatically selected based on the training scores.

With such or similar logic, prior to each time of repetition of any stored individual DSL-connection profile, a start time of correspondingly adjusting the condition of the DSL-connection can be set to respectively match a respective imminent stored individual DSL-connection profile with the synchronization therefor preferably already finished. Such synchronization can be initiated, for example, by an automatic data transfer query of the router or by a defined communication to a central instance.

Thus, based on the above description, for the setting of such start time of correspondingly adjusting the condition of the DSL-connection or generally spoken of an xDSL-connection, i.e. prior to each time of repetition of any stored individual DSL-connection profile, a respective priority assigned to each stored individual DSL-connection profile can be used. In addition or alternatively, empirical values, especially based on the self-training adaptation functionality described above, can be used to set an individual start time for the respective times of repetition of any stored individual DSL connection profile, which is sufficient to respectively match a respective imminently stored individual DSL connection profile with the synchronization therefor preferably already finished. Accordingly, the start times of correspondingly adjusting the condition of the DSL-connections can be assigned to and stored together with each stored individual DSL connection profile.

Accordingly, as a preferred embodiment, not only the respective imminent stored individual DSL-connection profile but furthermore the respective start time for initiating the synchronization of this respective imminent stored individual DSL-connection profile can be preferably taken from or given by the operations scheduling memory, as indicated and referenced by the arrow numbered with 3.

Of course, according to further exemplary embodiments, any currently used condition of the DSL-connection can be interrupted, when detecting a predefined event and based thereon to adjust the condition of the DSL-connection to match a predefined DSL-connection profile associated with this predefined event. Such a predefined event can be for example any activation or new request of at least one service via the DSL-connection during an idle condition or during any other currently used individual DSL-connection profile in case the bandwidth and/or ensured data rate provided therewith should be not enough.

In this regard, even movements, in particular unexpected movements, can be used as such predefined events. On the basis of a detected movement, for example, it is then expected that the user wants to use a Service via its DSL-connection even during an unused period and hence, the DSL-connection should now be synchronized again so that the user does not have to wait at the beginning of the possible use.

For detecting movements, a variety of different sensors can be used such as light sensors, motion sensors or noise sensors, preferably coupled with the user's access point. Such sensors also can be integrated for example in smartphones or any wearables such as smart watches.

For detecting movements, a change of attenuation of WLAN-power can be used as an indicator, too. For the detection of changes in WLAN attenuation and the correspondingly detected movements of human bodies in a monitored room, the sending and receiving of internet control message protocol signals between the user's access point and a further detection point, such as a mobile phone for example, can be used. The thereby collected WLAN channel state information in principle is sensitive enough to determine upon filtering such data transmission signals, whether a static environment behavior or a dynamic environment behavior is given. A dynamic environment behavior is given in particular, in case an individual is walking around. An example of such detection of changes in WLAN attenuation is described for example in an open access article "Wi-Alarm: Low-Cost Passive Intrusion Detection Using WiFi" of Tao Wang, Dandan Yang, Shunqing Zhang, Yating Wu and Shugong Xu, published on 21 May 2019 by the MDPI ("Molecular Diversity Preservation International") Institute.

Of course, according to further exemplary embodiments, interruptions of stored individual DSL-connection profiles can be also set, in particular by user inputs. Examples are e.g. a time of vacation placement, a party condition and so on.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of generating and handling of Digital Subscriber Line (DSL) connection profiles, comprising:
    collecting, each time a service is requested by a user of a DSL-connection, individual service-based-data, wherein the individual service-based-data comprise the start time and end time of use of the requested service and a transmit spectrum routed via the DSL-connection during the use of the requested service;
    analyzing the collected individual service-based-data and based thereon assigning to the analyzed collected individual service-based-data a current individual DSL-connection profile comprising individual repetition times and an individual mean transmit data rate;
    comparing the current individual DSL-connection profile with an individual DSL-connection profile stored in an operations scheduling memory; and
    based on the comparing, updating an already stored individual DSL-connection profile based on the current individual DSL-connection profile or storing the current individual DSL-connection profile as a further individual DSL-connection profile in the operations scheduling memory;
    wherein the method further comprises: prior to each time of repetition of a stored individual DSL-connection profile, setting a start time of correspondingly adjusting the condition of the DSL-connection to respectively match a respective imminent stored individual DSL-connection profile.

2. The method according to claim 1, wherein collecting the individual service-based-data comprises collecting data relating to at least one of the following:
    the kind of service,
    the direction of data transfer,
    a distinction between peak data rate and average data rate,
    Domain Name System (DNS) queries called by the user,
    packet headers and Quality of Services (QoS),
    the required bandwidth, and
    the respective user end device actively using the DSL-connection.

3. The method according to claim 1, wherein to each individual DSL-connection profile a respective priority is assigned and in case the condition of the DSL-connection is to be adjusted starting from a currently used individual DSL-connection profile to match another individual but lower-priority DSL-connection profile, the start time of correspondingly adjusting the condition of the DSL-connection is set only on or after the end time of the currently used individual DSL-connection profile.

4. The method according to claim 3, further comprising:
    detecting a predefined event and in response thereto interrupting the currently used condition of the DSL-connection and adjusting the condition of the DSL-connection to match a predefined DSL-connection profile associated with this predefined event.

5. The method according to claim 4, wherein the detecting comprises detecting a movement, a change of attenuation of Wireless Local Area Network (WLAN)-power, and/or the new request of at least one service via the DSL-connection.

* * * * *